(12) United States Patent
Chen et al.

(10) Patent No.: US 9,939,254 B2
(45) Date of Patent: Apr. 10, 2018

(54) INTRACAVITY FIBER SENSOR FOR MEASURING SLIDING BASED ON FABRY-PEROT INTERFEROMETER

(71) Applicant: Yizheng Chen, Jilin (CN)

(72) Inventors: Yizheng Chen, Jilin (CN); Yan Tang, Jilin (CN); Qiang Gao, Jilin (CN)

(73) Assignee: Yizheng Chen, Jilin (CN)

( * ) Notice: Subject to any disclaimer, the term of this patent is extended or adjusted under 35 U.S.C. 154(b) by 0 days.

(21) Appl. No.: 15/256,699

(22) Filed: Sep. 5, 2016

(65) Prior Publication Data
US 2017/0167858 A1 Jun. 15, 2017

(30) Foreign Application Priority Data

Dec. 15, 2015 (CN) .......................... 2015 1 0933829

(51) Int. Cl.
*G01D 5/353* (2006.01)
*G01B 11/16* (2006.01)
*G01B 11/00* (2006.01)

(52) U.S. Cl.
CPC .......... *G01B 11/161* (2013.01); *G01B 11/002* (2013.01)

(58) Field of Classification Search
CPC .... G01B 11/161; G01B 9/0205; G01D 5/266; G01D 5/353; G01D 5/35303; G01D 5/35306; G01D 5/35309; G01D 5/35312
See application file for complete search history.

(56) References Cited

U.S. PATENT DOCUMENTS

| 5,118,931 A | 6/1992 | Udd et al. |
| 6,252,229 B1 | 6/2001 | Hays et al. |
| 7,249,420 B2 | 7/2007 | Otsubo et al. |
| 2005/0157305 A1* | 7/2005 | Yu ...................... G01D 5/35303 356/480 |
| 2008/0259346 A1* | 10/2008 | Strahle ................... G01B 11/12 356/496 |
| 2010/0290059 A1* | 11/2010 | Inoue ................. A61B 1/00096 356/477 |
| 2015/0146208 A1* | 5/2015 | Riegger ............... G01B 9/0205 356/477 |

* cited by examiner

*Primary Examiner* — Jonathan Hansen
(74) *Attorney, Agent, or Firm* — Gokalp Bayramoglu

(57) ABSTRACT

The present invention provides the sensor for measuring the relative sliding between two interfaces based on the principle of EFPI. The sensor comprises two optical fibers and two slopes arranged on the reflective slope. Each surface of the slope is disposed with reflecting surface; and the bottom of each optical fiber is arranged with reflecting end surface. The reflecting surfaces are perpendicular to each of an optical axis of the fiber, thus the Fabry-Perot cavity is formed between reflective end surface and emitting surface to measure the sliding of object B relative to object A in a plane. A fiber and a slope can also be further added to measure the sliding of object B relative to object A in a three dimensional space. The sensor does not affected by the temperature and electromagnetic interference; and has the advantages of high accuracy, strong resisting interference capability and durability. The present sensor has wide application, especially suitable for precisely measuring the sliding and the temperature of the structure under static and dynamic or long-term loading and thus can evaluate the safety of the structures.

10 Claims, 3 Drawing Sheets

INTRACAVITY FIBER SENSOR FOR MEASURING SLIDING BASED ON FABRY-PEROT INTERFEROMETER

CROSS REFERENCE TO RELATED APPLICATION

This application claims priority of Chinese Patent Application No. 201510933829.1, filed on Dec. 15, 2015, the entire content of which is incorporated herein by reference.

TECHNICAL FIELD

The present invention generally relates to a sensor for measuring sliding, and particularly to an intracavity fiber sensor for measuring sliding based on Fabry-Perot interferometer, and belongs to the field of sensor.

BACKGROUND

The interfacial sliding of the composite steel-concrete structures is unavoidable due to the debonding between the steel and concrete of the composite steel-concrete structures is less than that of the reinforcement concrete. The relative sliding of the interface is primarily yielded by the insufficient shear bond strength at the interface of the steel and concrete, which reduces the composite function and leads to the inconsistent deformation. The mechanical and electrical instruments were usually applied for measurement of the sliding in the prior art; however, those instruments have high requirements on the application environment; for instance, the environments with high temperature, low temperature or strong electromagnetic interference are not suitable for application. Moreover, the sliding between concrete and steel is usually rather small. Therefore, a kind of measuring device with high precision is needed.

SUMMARY

In order to address the technical problems mentioned above, the present invention provides a sensor to measure the relative sliding at the interface based on the mechanism of EFPI. The sensor comprises two optical fibers and two slopes arranged on the reflective slope. Each surface of the slope is arranged with reflecting surface; and the bottom of each optical fiber is arranged with reflecting end surface. The reflecting surfaces are perpendicular to each of an optical axis of the fiber, thus the Fabry-Perot cavity is formed between reflective end surface and emitting surface to measure the sliding of object B relative to object A in a plane. While measuring the sliding in XOZ plane, two slopes can not only enlarge the measuring range, but also can eliminate the combined affect of both X and Z on one slope; thereby two fibers can be employed to jointly solve the sliding in X direction and movement in Z direction. A fiber and a slope plane can also be further added to measure the sliding of object B relative to Object A in a three dimensional space.

In order to achieve the above purposes, the technical scheme of the present invention is as follows:

The present invention provides an intracavity fiber sensor for measuring sliding based on Fabry-Perot interferometer, including reflective slope, sealable dust cover, sensor body, the first fiber and the second fiber, wherein:

The sealable dust cover is a flexible pipe passing through two ends and a cavity arranged inside. One end of the flexible pipe is sealably connected to the sensor body, and the other end is sealably connected to the reflective slope.

The reflective slope, of which the downside is a plane, and the upside is arranged with the first slope and the second slope which have declination angles $\theta_1$ and $\theta_2$ with the downside plane, respectively. The upside surfaces of the first slope and the second slope are arranged with the reflecting surface. Also, the condition the first slope and the second slope must satisfy is that the determinant $$\begin{vmatrix} l_1 & l_2 \\ n_1 & n_2 \end{vmatrix}$$

is not zero, wherein, $(l_1,n_1)^T$ is the normal vector of the first slope, and $(l_2,n_2)^T$ is the normal vector of the second slope.

Both the first optical fiber and the second optical fiber are arranged with reflective end surface at their bottom, travel through the sensor body and extend into the cavity. The optical axis of the first optical fiber and the second optical fiber is perpendicular to the first slope and the second slope, respectively.

As the preferred choice, the reflective slope is a rigid body.

The first intersecting line which is intersected by the plane belong to the first slope and the downside plane is parallel to the second intersecting line which is intersected by the plane belong to the second slope and the downside plane. And the condition the angles $\theta_1$ and $\theta_2$ must satisfy is that the determinant $$\begin{vmatrix} \sin\theta_1 & \cos\theta_1 \\ -\sin\theta_2 & \cos\theta_2 \end{vmatrix}$$

is not zero.

The first intersecting line which is intersected by the plane belong to the first slope and the downside plane, is perpendicular to the second intersecting line which is intersected by the plane belong to the second slope and the downside plane. And the condition the angles $\theta_1$ and $\theta_2$ must satisfy is that sin $\theta_1$ sin $\theta_2$ is not equal to zero.

The present sensor also includes the third optical fiber, of which a reflecting end surface is arranged at the bottom. The third optical fiber travels through the sensor body and extends into the cavity.

The upside of the reflective slope is also arranged with the third slope, which has an inclination angel designated as $\theta_3$ with the downside plane. The upside of the third slope is arranged with the reflecting surface.

Also, the condition the first slope, the second slope and the third slope must satisfy is that the determinant $$\begin{vmatrix} l_1 & l_2 & l_3 \\ m_1 & m_2 & m_3 \\ n_1 & n_2 & n_3 \end{vmatrix}$$

is not equal to zero.

Wherein, $(l_1,m_1,n_1)^T$, $(l_2,m_2,n_2)^T$ and $(l_3,m_3,n_3)^T$ are the normal vectors for the first, the second and the third slope, respectively.

Also, the optical axis of the third fiber is perpendicular to the third slope.

The first intersecting line which is intersected by the plane belong to the first slope and the downside plane is parallel to the second intersecting line which is intersected by the plane belong to the second slope and the downside plane. And the third intersecting line which is intersected by the plane belong to the third slope and the downside plane is perpendicular to both the first and the second intersecting line. Also, the condition the angles $\theta_1$, $\theta_2$ and $\theta_3$ satisfied is that the determinant $$\begin{vmatrix} \sin\theta_1 & 0 & \cos\theta_1 \\ 0 & -\sin\theta_3 & \cos\theta_3 \\ -\sin\theta_2 & 0 & \cos\theta_2 \end{vmatrix}$$

is not zero.

As the preferred choice, wherein said $-90° \leq \theta_1, \theta_2, \theta_3 \leq 90°$.

As the preferred choice, the material of the sealable dust cover is the acid and alkali resistant flexible material.

As the preferred choice, the one or more of the first optical fiber 4, the second optical fiber and the third optical fiber is in series with the Fiber Bragg Gratings.

The beneficial effect of the present invention are as follows:

(1) The intracavity fiber sensor for measuring sliding based on Fabry-Perot interferometer provided in present invention elegantly combines the principle of the EFPI and mechanical designing. The relative slip between two interfaces can be transformed into the rather small variation of the cavity length by adopting simple EFPI structure. Meanwhile, the relative movement in normal direction between two interfaces can also be measured. Thus the greatly precise sliding in different directions is obtained.

(2) The intracavity fiber sensor for measuring sliding based on Fabry-Perot interferometer provided in present invention almost has no effect from temperature, completely has no electromagnetic interference, and has the advantage of being able to conduct the long-term monitoring at sites with large temperature difference and severe conditions, thus has very strong practicality.

(3) The intracavity fiber sensor for measuring sliding based on Fabry-Perot interferometer provided in present invention has considerable high shaking shock prevention technology which can ensure that the interference cavity length does not change due to the shaking and vibration of the main rod.

(4) The impact of the temperature on the intracavity fiber sensor for measuring sliding based on Fabry-Perot interferometer provided in present invention is too small to affect the measuring accuracy and even can be neglected.

(5) If the requirement on the accuracy is extremely high, the measuring accuracy can be improved by utilizing temperature compensation which is realized through a series connection of a FBG on one of the fiber.

Among the drawings: 1 is the reflective slope, 2 is the sealable dust cover, 3 is the sensor body, 4 is the first fiber, 5 is the second fiber, 6 is the first slope, 7 is the second slope, 8 is the cavity body, 9 is the third slope.

DETAILED DESCRIPTION

The present invention provides a further detailed description in conjunction with the detailed description of the embodiments as follows.

In the description of the invention, the orientation or position indicated by the terminologies of front, rear, left, right, up, down, top and bottom are based on the orientation or position shown in the accompanying drawing 1, which is only adopted to facilitate the description of the invention, not to require the present invention must be in a specific orientation structure and operation. Therefore, they cannot be interpreted as the limitation of the present invention.

In the description of the invention, when the first slope is located above the XOY plane, the value of $\theta_1$ is greater than zero, vice is less than zero; when the second slope is located above the XOY plane, the value of $\theta_2$ is greater than zero, vice is less than zero; when the third slope is located above the XOY plane, the value of $\theta_3$ is greater than zero, vice is less than zero.

Embodiment 1

Figure 1:
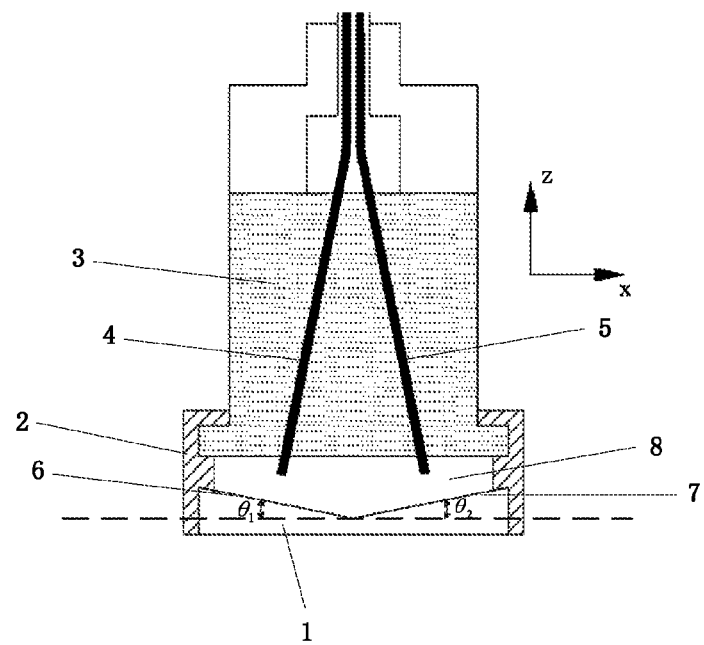
FIG. 1 is a front view of an intracavity fiber sensor for measuring sliding based on Fabry-Perot interferometer provided in embodiment 1 of the present invention.
Figure 2:
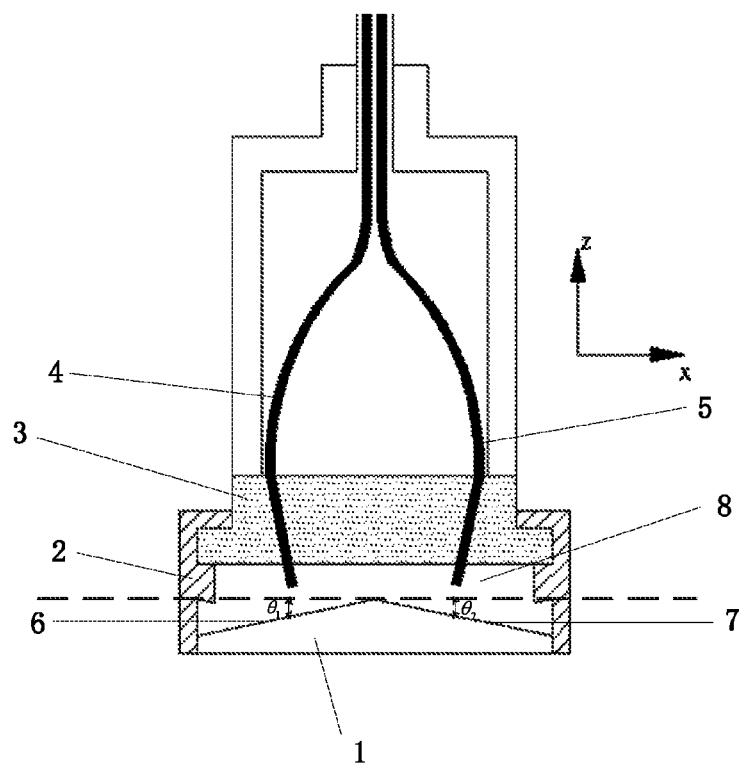
FIG. 2 is a front view of an intracavity fiber sensor for measuring sliding based on Fabry-Perot interferometer provided in embodiment 1 of the present invention.

The invention provides an intracavity fiber sensor for measuring sliding based on Fabry-Perot interferometer, as shown in FIG. 1 and FIG. 2, including reflective slope 1, sealable dust cover 2, sensor body 3, the first fiber 4 and the second fiber 5, wherein:

The material of the reflective slope and sensor body can be metal.

The sealable dust cover 2 is a flexible pipe passed through two ends and a cavity 8 arranged inside. One end of the flexible pipe is sealably connected to the sensor body 3, and the other end is sealably connected to the reflective slope 1.

The reflective slope 1, of which the downside is a plane, and the upside is arranged with the first slope 6 and the second slope 7 which have declination angles $\theta_1$ and $\theta_2$ with the downside plane, respectively. The upside surfaces of the first slope 6 and the second slope 7 are arranged with the reflecting surface. Also, the condition the first slope 6 and the second slope 7 must satisfy is that the determinant $$\begin{vmatrix} l_1 & l_2 \\ n_1 & n_2 \end{vmatrix}$$

is not zero, wherein, $(l_1, n_1)^T$ is the normal vector of the first slope 6, and $(l_2, n_2)^T$ is the normal vector of the second slope 7.

Both the first optical fiber 4 and the second optical fiber 5 are arranged with reflective end surface at their bottom, travel through the sensor body 3 and extend into the cavity 8. The optical axis of the first optical fiber 4 and the second optical fiber 5 is perpendicular to the first slope 6 and the second slope 7, respectively.

Two oblique pores are disposed on the sensor body, the first fiber and the second fiber pass the two oblique pores respectively and extend to the cavity body. Optionally, the two oblique pores are in a same plane.

The sensor is able to measure extremely small sliding below 10 nm and almost has no affect from the temperature during measurement by practical measurement. Also, when the adopted materials are stable, the sensor can work for a long time between thirty degrees below zero and hundred degrees above zero.

The working principle of the intracavity fiber sensor for measuring sliding based on Fabry-Perot interferometer provided in present embodiment is as follows.

In the sensor, passing the first and the second fiber through the sensor body and extending into the cavity body, arranging the reflecting end surface at the bottom of the first and second fiber, disposing the reflecting surface on the upside surface of the first and second slope, and the first and the second slope being perpendicular to the optical axis of the first and second fiber separately, thus the first Fabry-Perot cavity is formed between the emitting end surface of the first fiber and reflecting surface arranged on the top surface of the first slope, and the second Fabry-Perot cavity is formed between the emitting end surface of the second fiber and reflecting surface arranged on the top surface of the second slope. Due to the sealable cover dust being made of flexible material, the reflective slope can slip in a certain range, which further changes the cavity length of the two Fabry-Perot cavity. Thereby, the slip of the reflective slope in different directions can be measured by the adoption of the Fabry-Perot principle, namely, the cavity length can be calculated through the methods of curve fitting, fringe counting, the wave peak tracking or Fourier transform according to the information of the interference cavity of the Fabry-Perot cavity after obtaining the spectrogram corresponding to two fibers. The cavity length also has high accuracy with the general accuracy higher than 10 nm orders of magnitude.

During the practical manufacture of the sensor, the measuring range can be changed by changing the angles $\theta_1$ and $\theta_2$ according to the practical demand, and the greater the measuring range, the less the absolute value of the slope angle $\theta_1$ and $\theta_2$.

Optionally, $\theta_1$ and $\theta_2$ is equivalent.

The sensor is able to measure extremely small slip below 10 nm and almost has no affect from the temperature during measurement by practical measurement. Also, when the adopted materials are stable, the sensor can work for a long time between thirty degrees below zero and hundred degrees above zero.

After a 2D coordinate system XOZ is determined, the normal vector of the first and second slope can be determined; and the sliding on the X axis and the movement on the Z direction of object B relative to object A can be further measured. When object A has the movement along X and Z direction relative to object B, the Fabry-Perot cavity length can be changed; thereby the Fabry-Perot cavity length, $d_1$ and $d_3$, calculated from spectrum are transformed to $d'_1$ and $d'_3$, respectively, then:

$$\begin{Bmatrix} \Delta x \\ \Delta z \end{Bmatrix} = \left\{ \begin{bmatrix} l_1 & l_2 \\ n_1 & n_2 \end{bmatrix}^T \right\}^{-1} \begin{Bmatrix} d'_1 - d_1 \\ d'_3 - d_3 \end{Bmatrix} = \begin{bmatrix} l_1 & n_1 \\ l_2 & n_2 \end{bmatrix}^{-1} \begin{Bmatrix} d'_1 - d_1 \\ d'_3 - d_3 \end{Bmatrix}$$

Preferably, the reflective slope 1 is a rigid body.

When the reflective slope is rigid, the direction of motion of the first and second slope is ensured to be consistent.

Preferably, the first intersecting line, which is intersected by the plane belong to the first slope 6 and the downside plane, is parallel to the second intersecting line, which is intersected by the plane belonged to the second slope 7 and the downside plane.

Also, the condition the angles $\theta_1$ and $\theta_2$ must satisfy is that the determinant $$\begin{vmatrix} \sin\theta_1 & \cos\theta_1 \\ -\sin\theta_2 & \cos\theta_2 \end{vmatrix}$$

is not zero.

Figure 3:
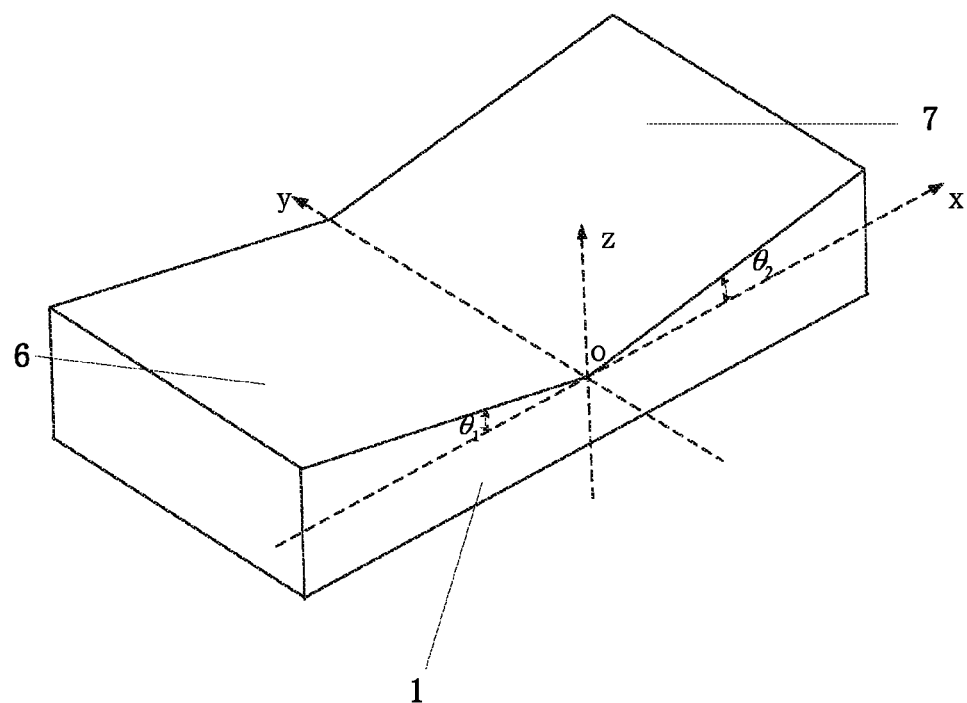
FIG. 3 is a stereogram of the reflective slope provided in embodiment 1 of the present invention.
Figure 4:
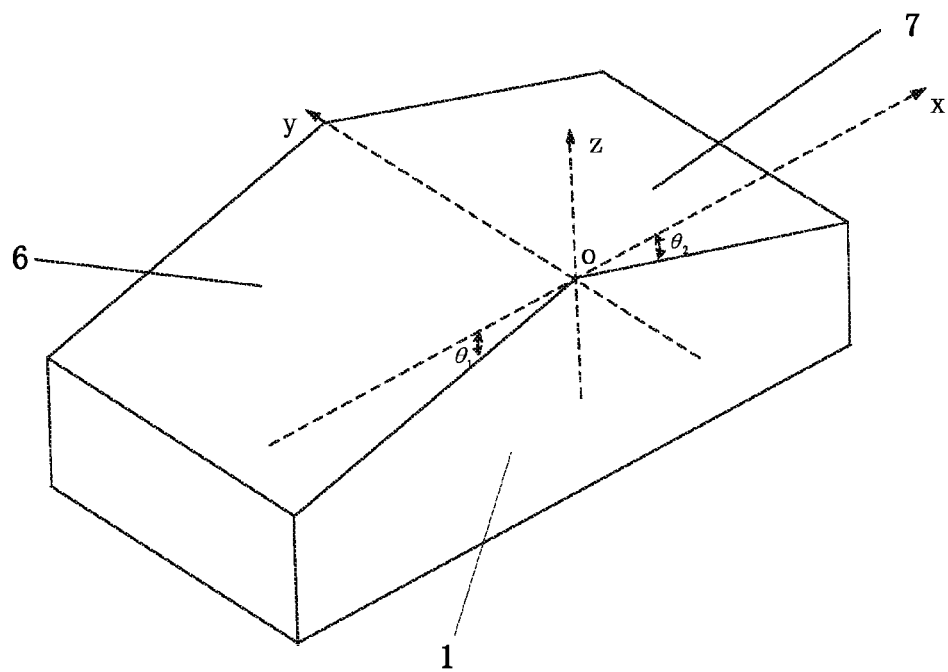
FIG. 4 is a stereogram of the reflective slope provided in embodiment 1 of the present invention.

As shown in FIG. 1 and FIG. 2, when in practical use, the slope is employed to enlarge the measuring range in X direction, but the distance from fiber to the slope are simultaneously impacted by the slip in X direction and movement in Z direction. In order to simultaneously measure the slip in X direction and movement in Z direction, the sensor uses two fibers and two reflecting surfaces to measure the sliding in a single direction. Specifically, taking the measurement of the movement between object A and object B as an example, grinding a small groove with a plane on the downside on the object B (the small groove is not actually required by another approach that welding, sticking or mechanically connecting the reflective slope on the object B and arranging the flexible material around the reflective slope), and bonding the downside of the reflective slope of the sensor with the downside of the small groove; as illustrated in FIG. 3 and FIG. 4, in the practical measurement of sliding for single direction using the sensor, the intersecting line of the first slope and second slope is Y axis, X axis is a straight line parallel to the downside plane of the reflective slope and normal to the Y axis, thus Z axis is a straight line simultaneously perpendicular to X and Y axis. Meanwhile, the positive direction of the X, Y, and Z axis can be determined by the users, the present sensor can measure the slip in X direction and the movement in Z direction. If the sensor body of the present sensor is connected to object A, which is then considered as located on Z axis, the movement of object B in XOZ plane can be measured. When object A has the movement in XOZ plane relative to object B, the first and second Fabry-Perot cavity length can be changed. The first and second Fabry-Perot cavity length, $d_1$ and $d_3$ calculated from spectrum are transformed to $d'_1$ and $d'_3$, respectively. According to the coordinate direction as shown in FIG. 3 and FIG. 4, the moving distance of object A relative to object B in X and Z direction, $\Delta x$ and $\Delta z$ can be expressed into:

$$\begin{Bmatrix} \Delta x \\ \Delta z \end{Bmatrix} = \begin{bmatrix} \sin\theta_1 & \cos\theta_1 \\ -\sin\theta_2 & \cos\theta_2 \end{bmatrix}^{-1} \begin{Bmatrix} d'_1 - d_1 \\ d'_3 - d_3 \end{Bmatrix}$$

Optionally, the determinant $$\begin{vmatrix} \sin\theta_1 & \cos\theta_1 \\ -\sin\theta_2 & \cos\theta_2 \end{vmatrix}$$

is not zero.

It is noted that the determinant $$\begin{vmatrix} \sin\theta_1 & \cos\theta_1 \\ -\sin\theta_2 & \cos\theta_2 \end{vmatrix}$$

is not zero, which is belong to the protection scope of the invention, wherein, $-90°\leq\theta_1,\theta_2\leq90°$.

Preferably, $-45°\leq\theta_1,\theta_2\leq45°$.

Preferably, the material of the sealable dust cover is flexible and acid and alkali resistant.

If the sealable dust cover is acid and alkali resistant, the present sensor can be used in a severe environmental condition.

Preferably, the first fiber 4 and the second fiber 5 are the single or multi-mode fiber.

Optionally, the distance from the end of the Fiber Bragg gratings to the reflective end is 1-3 mm.

The Fiber Bragg Grating must be straight and without any stress (namely the FBG is free and has no tensile or compress stress).

Embodiment 2

Figure 5:
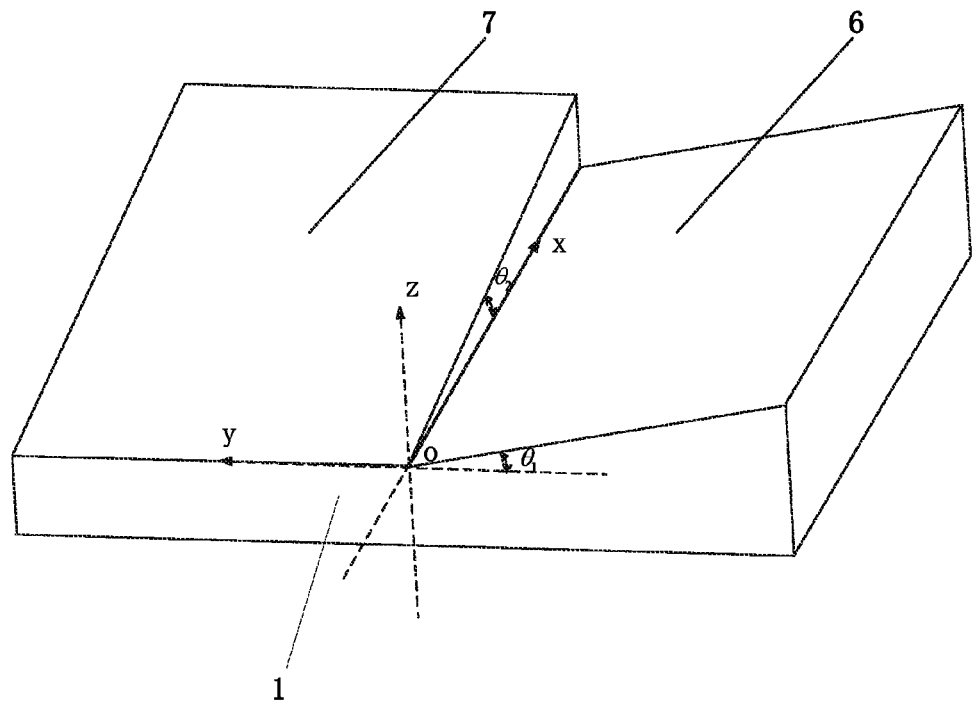
FIG. 5 is a stereogram of the reflective slope provided in embodiment 2 of the present invention.

The present embodiment has some improvements on the basis of embodiment 1, as shown in FIG. 5, the improved contents are specifically as follows:

The first intersecting line, which is intersected by the plane belong to the first slope 6 and the downside plane, is perpendicular to the second intersecting line, which is intersected by the plane belong to the second slope 7 and the downside plane.

Also, the condition the angles $\theta_1$ and $\theta_2$ must satisfy is that $\sin\theta_1 \sin\theta_2$ is not zero.

As shown in FIG. 5, when in practical use, under the condition that there is no movement in Z direction such as the contact surface of two plane is very smooth, the sensor uses two fibers and two reflecting surfaces to measure the sliding in a single direction. Specifically, taking the measurement of the movement between object A and object B as an example, grinding a small groove with a plane on the downside on the object B (the small groove is not actually required by another approach that welding, sticking or mechanically connecting the reflective slope on the object B and arranging the flexible material around the reflective slope), and bonding the downside of the reflective slope of the sensor with the downside of the small groove; As illustrated in FIG. 5, in the practical measurement of slip for double direction using the sensor, the intersecting line of the first slope and the bottom plane of the reflective slope is X axis, the intersecting line of the second slope and the bottom plane of the reflective slope is Y axis, thus Z axis is a straight line simultaneously perpendicular to X and Y axis. Meanwhile, the positive direction of the X, Y, and Z axis can be determined by the users, the present sensor can measure the slip in X and Y direction. If the sensor body of the present sensor is connected to object A, which is then considered as located on Z axis, the movement of object B in XOY plane can be measured. When object A has the movement in XOY plane relative to object B, the first and second Fabry-Perot cavity length can be changed. The first and second Fabry-Perot cavity length calculated from spectrum varies from $d_1$ and $d_2$ to $d'_1$ and $d'_2$, respectively. According to the coordinate direction as shown in FIG. 5, the moving distance of object A relative to object B in X and Y direction, $\Delta x$ and $\Delta y$ can be expressed into:

$$\begin{Bmatrix}\Delta x \\ \Delta y\end{Bmatrix} = \begin{bmatrix}-\sin\theta_2 & 0 \\ 0 & \sin\theta_1\end{bmatrix}^{-1}\begin{Bmatrix}d'_1 - d_1 \\ d'_2 - d_2\end{Bmatrix}$$

Embodiment 3

Figure 6:
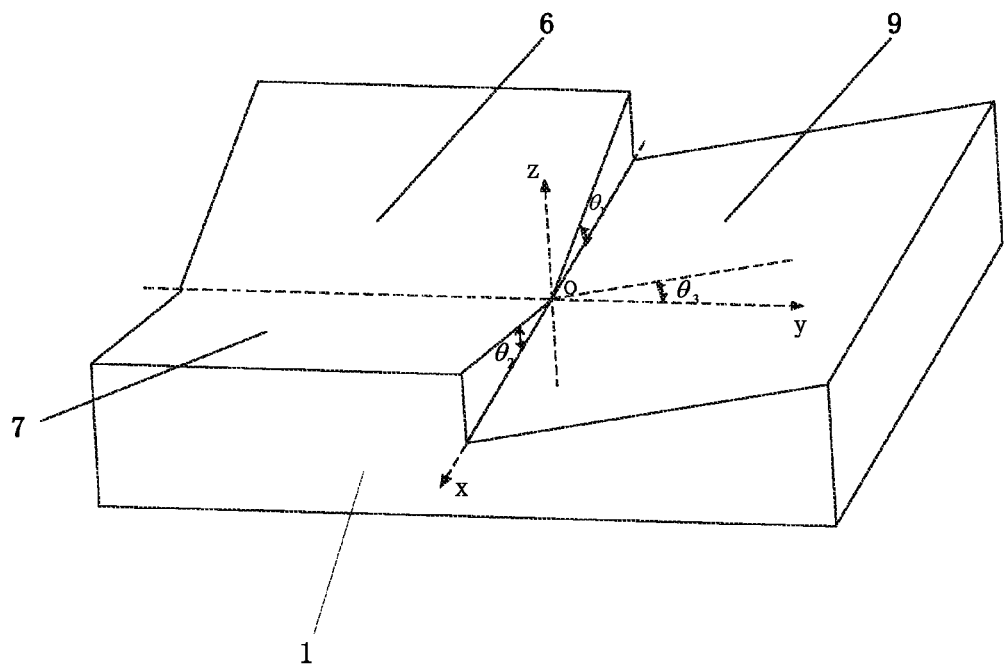
FIG. 6 is a stereogram of the reflective slope provided in embodiment 3 of the present invention.

The present embodiment makes some improvements based on embodiment 1, as shown in FIG. 6, the improved contents are specifically as follows:

The present sensor also includes the third optical fiber, of which a reflecting end surface is arranged at the bottom. The third optical fiber travels through the sensor body 3 and extends into the cavity 8.

The upside of the reflective slope 1 is also arranged with the third slope 9, which has an inclination angel designated as $\theta_3$ with the downside plane. The upside of the third slope 9 is arranged with the reflecting surface.

Also, the condition the first slope 6, the second slope 7 and the third slope 9 must satisfy is that the determinant $$\begin{vmatrix}l_1 & l_2 & l_3 \\ m_1 & m_2 & m_3 \\ n_1 & n_2 & n_3\end{vmatrix}$$

is not equal to zero.

Wherein, $(l_1,m_1,n_1)^T$, $(l_2,m_2,n_2)^T$ and $(l_3,m_3,n_3)^T$ are the normal vectors for the first, the second and the third slope, respectively.

Also, the optical axis of the third fiber is perpendicular to the third slope 9.

The operation principle of the intracavity fiber sensor for measuring sliding based on Fabry-Perot interferometer provided in present embodiment is as follows.

In the sensor, passing the first, second and third fiber through the sensor body and extending into the cavity body, arranging the reflecting end surface at the bottom of the first, second and third fiber, disposing the reflecting surface on the upside surface of the first, second and third slope, and the first, second and third slope being perpendicular to the optical axis of the first, second and third fiber respectively, thus the first Fabry-Perot cavity is formed between the emitting end surface of the first fiber and reflecting surface arranged on the top surface of the first slope, the second Fabry-Perot cavity is formed between the emitting end surface of the second fiber and reflecting surface arranged on the top surface of the second slope, and the third Fabry-Perot cavity is formed between the emitting end surface of the third fiber and reflecting surface arranged on the top surface of the third slope.

Due to the sealable dust cover being made of flexible material, the reflective slope can slip in a certain range, which further changes the cavity length of the three Fabry-Perot cavity. Thereby, the slip of the reflective slope in different directions can be measured by the adoption of the Fabry-Perot principle, namely, when in measurement, the cavity length can be calculated through the methods of curve fitting, fringe counting, the wave peak tracking or Fourier transform according to the information of the interference cavity of the Fabry-Perot cavity after obtaining the spectrogram corresponding to three fibers. The cavity length also has high accuracy with a general accuracy higher than 10 nm orders of magnitude.

During the practical manufacture of the sensor, the measuring range can be changed by changing the angles $\theta_1$, $\theta_2$ and $\theta_3$ according to the practical demand, and the greater the measuring range, the less the absolute value of the slope angles $\theta_1$, $\theta_2$ and $\theta_3$. Generally, three angles are equivalent.

After practical measurement, the sensor is able to measure extremely small slip below 10 nm and almost has no affect from the temperature during measurement. Also, when the adopted materials are stable, the sensor can work for a long time between thirty degrees below zero and hundred degrees above zero.

When in practical use, in order to simultaneously measure the sliding in X and Y direction and movement in Z direction, the present sensor uses three fibers and three reflecting surfaces to measure the slip in double directions. Specifically, taking the measurement of the movement between object A and object B as an example, grinding a small groove with a plane on the downside on the object B (the small groove is not actually required by another approach that welding, sticking or mechanically connecting the reflective slope on the object B and arranging the flexible material around the reflective slope), and bonding the downside of the reflective slope of the sensor with the downside of the small groove. After a 3D coordinate system XYZ is determined, the normal vector of the first, second and third slope can be determined; and the slip on the X and Y axis and the movement on the Z axis of the object B relative to object A can be further measured. When the object A has the movement along X, Y and Z direction relatively to object B, the first, second and third Fabry-Perot cavity length can be changed; thereby the first, second and third Fabry-Perot cavity length, $d_1$, $d_2$ and $d_3$, calculated from spectrum, are transformed to $d'_1$, $d'_2$ and $d'_3$, respectively. Then, $$\begin{Bmatrix} \Delta x \\ \Delta y \\ \Delta z \end{Bmatrix} = \left\{ \begin{bmatrix} l_1 & l_2 & l_3 \\ m_1 & m_2 & m_3 \\ n_1 & n_2 & n_3 \end{bmatrix}^T \right\}^{-1} \begin{Bmatrix} d'_1 - d_1 \\ d'_2 - d_2 \\ d'_3 - d_3 \end{Bmatrix} = \begin{bmatrix} l_1 & m_1 & n_1 \\ l_2 & m_2 & n_2 \\ l_3 & m_3 & n_3 \end{bmatrix}^{-1} \begin{Bmatrix} d'_1 - d_1 \\ d'_2 - d_2 \\ d'_3 - d_3 \end{Bmatrix}$$

Preferably, the first intersecting line intersected by the plane belong to the first slope 6 and the downside plane, is parallel to the second intersecting line intersected by the plane belong to the second slope 7 and the downside plane. And the third intersecting line intersected by the plane belong to the third slope 9 and the downside plane is perpendicular to the first and second intersecting line.

Also, the condition that the angels $\theta_1$, $\theta_2$ and $\theta_3$ must satisfy is that the determinant $$\begin{vmatrix} \sin\theta_1 & 0 & \cos\theta_1 \\ 0 & -\sin\theta_3 & \cos\theta_3 \\ -\sin\theta_2 & 0 & \cos\theta_2 \end{vmatrix}$$

is not zero.

As shown in FIG. 6, when in practical use, in order to simultaneously measure the slip in X and Y direction and movement in Z direction, the present sensor uses three fibers and three reflecting surfaces to measure the slip in double directions. Specifically, taking the measurement of the 3D movement between object A and object B as an example, grinding a small groove with a plane on the downside on the object B and bonding the downside of the reflective slope of the sensor with the downside of the small groove, the small groove is not actually required by another approach that welding, sticking or mechanically connecting the reflective slope on the object B and arranging the flexible material around the reflective slope to eliminate the direct contact between the surrounding of the reflective slope and object A. In the practical 3D measurement of the slip using the sensor, the intersecting line of the first slope and the second slope is Y axis, X axis is a straight line parallel to the bottom plane of the reflective slope and perpendicular to the Y axis, thus Z axis is a straight line simultaneously perpendicular to X and Y axis. Meanwhile, the positive direction of the X, Y, and Z axis can be determined by the users, the present sensor can measure the sliding in X and Y direction and the movement in Z direction. When object A has the movement along X, Y and Z axis relatively to object B, the first, second and third Fabry-Perot cavity length can be changed. The first, second and third Fabry-Perot cavity length, $d_1$, $d_2$ and $d_3$ calculated from spectrum are transformed to $d'_1$, $d'_2$ and $d'_3$, respectively. According to the coordinate direction as shown in FIG. 6, the moving distance between two objectives in X Y and Z direction, $\Delta x$, $\Delta y$ and $\Delta z$ can be expressed into:

$$\begin{Bmatrix} \Delta x \\ \Delta y \\ \Delta z \end{Bmatrix} = \begin{bmatrix} \sin\theta_1 & 0 & \cos\theta_1 \\ 0 & -\sin\theta_3 & \cos\theta_3 \\ -\sin\theta_2 & 0 & \cos\theta_2 \end{bmatrix}^{-1} \begin{Bmatrix} d'_1 - d_1 \\ d'_2 - d_2 \\ d'_3 - d_3 \end{Bmatrix}$$

It is noted that the determinant $$\begin{vmatrix} \sin\theta_1 & 0 & \cos\theta_1 \\ 0 & -\sin\theta_3 & \cos\theta_3 \\ -\sin\theta_2 & 0 & \cos\theta_2 \end{vmatrix}$$

is not zero, which is belong to the protection scope of the invention, wherein, $-90° \leq \theta_1, \theta_2, \theta_3 \leq 90°$.

Preferably, $-45° \leq \theta_1, \theta_2, \theta_3 \leq 45°$.

Preferably, the material of the sealable dust cover 2 is flexible and acid and alkali resistant.

If the sealable dust cover is acid and alkali resistant, the present sensor can be used in a severe environmental condition.

Optionally, the first fiber 4, the second fiber 5 and the third fiber are the single or multi-mode fiber.

Preferably, the one or more of the first fiber 4, the second fiber 5 and the third fiber is in series with the Fiber Bragg Gratings.

Optionally, the distance from the end of the Fiber Bragg gratings to the reflective end is 1-3 mm.

The Fiber Bragg Grating must be straight and without any stress (namely the FBG is free and has no tensile or compress stress).

Obviously, the above said embodiments are only the examples for clearly illustrating the present sensor, not the limit to the embodiments. For those of ordinary skill in the art, the variations in different styles can be made on the basis of the present illustration. Hereinafter, it is not necessary to describe all of the embodiment. However, the obvious variations extended from the present illustration are also been protected in present invention.

What is claimed is:

1. An intracavity fiber sensor for measuring sliding and debonding between two interfaces based on Fabry-Perot (F-P) interferometer, comprising:
    a reflective slope, a sealable dust cover, a sensor body, a first fiber, and a second fiber,
    wherein,
    the sealable dust cover is a flexible pipe and a cavity is arranged inside the flexible pipe;
    one end of the flexible pipe is sealably connected to the sensor body, and an other end is sealably connected to the reflective slope;

the downside of the reflective slope is a plane, and the upside is arranged with a first slope and a second slope having declination angles $\theta_1$ and $\theta_2$ with the downside plane, respectively;

upside surfaces of both the first slope and the second slope are arranged with the reflecting surface, and the first slope and the second slope satisfy that the determinant $$\begin{vmatrix} l_1 & l_2 \\ n_1 & n_2 \end{vmatrix}$$

is not zero, wherein, $(l_1, n_1)^T$ is the normal vector of the first slope, and $(l_2, n_2)^T$ is the normal vector of the second slope; and the first optical fiber and the second optical fiber are arranged with a reflective end surface at their bottom, the first optical fiber and the second optical fiber pass through the sensor body and extend into the cavity, and the optical axis of the first optical fiber is perpendicular to the first slope and the optical axis of the second optical fiber is perpendicular to the second slope.

2. The intracavity fiber sensor for measuring sliding based on Fabry-Perot interferometer according to claim 1, wherein the reflective slope is a rigid body.

3. The intracavity fiber sensor for measuring sliding based on Fabry-Perot interferometer according to claim 2, wherein the first intersecting line which is intersected by the plane belong to the first slope and the downside plane is parallel to the second intersecting line which is intersected by the plane belong to the second slope and the downside plane; and the angles $\theta_1$ and $\theta_2$ satisfy that the determinant $$\begin{vmatrix} \sin\theta_1 & \cos\theta_1 \\ -\sin\theta_2 & \cos\theta_2 \end{vmatrix}$$

is not zero.

4. The intracavity fiber sensor for measuring sliding based on Fabry-Perot interferometer according to claim 2, wherein the first intersecting line which is intersected by the plane belong to the first slope and the downside plane, is perpendicular to the second intersecting line which is intersected by the plane belong to the second slope and the downside plane; and the angles $\theta_1$ and $\theta_2$ satisfy that $\sin\theta_1 \sin\theta_2$ is not equal to zero.

5. The intracavity fiber sensor for measuring sliding based on Fabry-Perot interferometer according to claim 4, wherein $-90°\leq\theta_1,\theta_2\leq90°$.

6. The intracavity fiber sensor for measuring sliding based on Fabry-Perot interferometer according to claim 2, wherein the interactivity fiber sensor further includes a third optical fiber, and the third optical fiber passes through the sensor body and extends into the cavity;

the upside of the reflective slope is arranged with a third slope, wherein the upside of the reflective slope has an inclination angel designated as $\theta_3$ with the downside plane, and the upside of the third slope is arranged with the reflecting surface;

the first slope, the second slope and the third slope satisfy that the determinant $$\begin{vmatrix} l_1 & l_2 & l_3 \\ m_1 & m_2 & m_3 \\ n_1 & n_2 & n_3 \end{vmatrix}$$

is not equal to zero, wherein, $(l_1, m_1, n_1)^T$, $(l_2, m_2, n_2)^T$ and $(l_3, m_3, n_3)^T$ are the normal vectors for the first slope, the second slope, and the third slope, respectively; and the optical axis of the third fiber is perpendicular to the third slope.

7. The intracavity fiber sensor for measuring sliding based on Fabry-Perot interferometer according to claim 6, wherein the first intersecting line which is intersected by the plane belong to the first slope and the downside plane is parallel to the second intersecting line which is intersected by the plane belong to the second slope and the downside plane;

the third intersecting line which is intersected by the plane belong to the third slope and the downside plane is perpendicular to both the first and the second intersecting line; and the angles $\theta_1$, $\theta_2$ and $\theta_3$ satisfy that the determinant $$\begin{vmatrix} \sin\theta_1 & 0 & \cos\theta_1 \\ 0 & -\sin\theta_3 & \cos\theta_3 \\ -\sin\theta_2 & 0 & \cos\theta_2 \end{vmatrix}$$

is not zero.

8. The intracavity fiber sensor for measuring sliding based on Fabry-Perot interferometer according to claim 7, wherein $-90°\leq\theta_1,\theta_2,\theta_3\leq90°$.

9. The intracavity fiber sensor for measuring sliding based on Fabry-Perot interferometer according to claim 8, wherein a material of the sealable dust cover is an acid and alkali resistant flexible material.

10. The intracavity fiber sensor for measuring sliding based on Fabry-Perot interferometer according to claim 9, wherein one or more of the first optical fiber, the second optical fiber and the third optical fiber is in series with the Fiber Bragg Gratings.

* * * * *